Patented Feb. 16, 1954

2,669,520

UNITED STATES PATENT OFFICE 2,669,520

PROCESSING OF SHELLFISH AND CRUSTACEANS

Carl R. Fellers, Amherst, Mass., assignor to Blue Channel Corporation, Port Royal, S. C., a corporation of Maryland No Drawing. Application June 2, 1950, Serial No. 165,867

15 Claims. (Cl. 99—160)

This invention relates to improvements in the treatment of seafood of shellfish and crustaceans and includes an improved method of preserving the natural color, flavor and appearance of such seafood, and the resulting seafood products.

The invention is based upon the discovery that improved edible seafood products such as iced, canned and frozen crabmeat, shrimp, scallops, oysters, lobsters, and clams can be effectively protected from discoloration by treatment with a small and regulated amount of a soluble ethylene bis - iminodiacetic acid (ethylenediamine tetracetic acid) compound, such as bis-iminodiacetic acid (ethylenediamine tetracetic acid) and its soluble salts such as the non-toxic sodium salts.

Crabs, lobsters, oysters, shrimp and some other seafoods contain copper as well as iron and even arsenic in some cases and may also contain other metals such as lead and manganese. In the canning and freezing of shellfish and crustaceans there are opportunities for metallic contamination from such sources as water, salt, cooking and blanching tanks, steamers, piping and other equipment, sea mud, etc. in addition to the metals present in the products themselves. I have found that the ethylenediamine tetracetic acid compounds are effective in neutralizing such contaminating metals as well as reactive copper, iron, arsenic and manganese which makes up a part of the flesh and viscera of these seafoods.

The seafoods which are treated according to the present invention include Atlantic and Pacific oysters, the Atlantic and Pacific edible crabs, the Atlantic and Pacific shrimps, lobsters, crayfish (spiny lobsters), scallops and clams (quahog, soft shell and razor types). The present invention enables such seafoods to be protected from discoloration as iced or frozen seafoods or as canned seafoods.

In such seafoods there is a tendency for the development of discoloration due to the presence of metals, and, generally speaking, the intensity of discoloration is roughly proportional for example to the quantity of copper and/or iron present in reactive form. I have determined that discoloration is usually more noticeable and changes adversely the normal appearance of the seafood following the application of heat as in blanching, pasteurizing, boiling, cooking, and canning in glass or tin containers. Such objectionable development of discoloration can be effectively prevented by the process of the present invention.

I have found that the quantities of ethylenediamine tetracetic acid compound necessary for complete prevention of discoloration depends upon the quantity of iron, copper or other metal present in reactive form in the food. I have found that as little as 5 to 10 parts per million for each part per million of copper or iron in the food is generally sufficient to prevent color change due to the metal, though larger amounts are more desirable in practice. The amount used is advantageously in excess of that which will react with and form a compound with the metal; and, in practice, around 5 to 10 mols of the ethylenediamine tetracetic acid compound are used for each mol of copper and iron. The amount required is not large and a small excess is advantageous over that which will immediately combine with reactive metals to provide a reserve supply to combine with any metals which may be formed during the subsequent processing operations or in the iced or frozen or canned seafood before use. An amount corresponding to from about 0.5 to 2 or 2.5 grams of the soluble ethylenediamine tetracetic acid compound per kilogram of seafood can thus be used.

The ethylenediamine tetracetic acid compound is advantageously the disodium salt. Such compounds form complexes or inner salts with metals such as copper and iron and thus remove the latter from reaction. I have found, however, that such complexes of inner salts are highly stable and unobjectionable in the resulting protected seafoods so that foods containing them can be stored for a year or more without separation or change in color or flavor. And I have found that only small quantities of the soluble ethylenediamine tetracetic acid compounds are required to attain the desired result.

In treating the seafood with the soluble ethylenediamine tetracetic acid compounds they may be treated either before or after heat treatment. They may also be added to the container of the seafood before sealing.

One method of carrying out the process is to make a solution of the ethylenediamine tetracetic acid compound by adding 200 grams of compound per liter of water so that one cubic centimeter of the solution will contain 0.2 gram of the compound, e. g., of the disodium salt of ethylenediamine tetracetic acid. I have obtained effective protection against the development of discoloration by the use of 1 to 5 cc. of this solution per 6½ to 7½-ounce cans of oysters, clams, lobster, crabmeat and crayfish. In order to insure thorough contact of the meat with the compound the can is advantageously inverted after sealing, if the solution of the compound is not admixed with the seafood before it is inserted in the can.

Another method of application which I have successfully used is a dip solution of water or salt brine containing from 0.1 to 5% of the ethylenediamine tetracetic acid sodium salt, depending upon the nature and quantity of reactive metal or metals present. For washing crabmeat, oysters, clams (hard and soft shell) lobster meat, crayfish (spiny lobster) marked advantage is obtained by simply passing the seafood through such a solution containing the compound in dilute concentrations. I have found that a 2% to 5% brine containing 0.5 to 2% of the compound is effective under most conditions where fresh seafoods are used. Oysters and crabmeat from both the Atlantic and the Pacific coasts were effectively treated in this way.

In the treatment of canned seafood, the can can be first filled and the soluble ethylenediamine tetracetic acid compound added directly to the oyster or clam juice, or to the dilute brine which is usually added to other seafoods. Care should be taken to see that the meat product is thoroughly wetted by the compound. This is conveniently done by inverting the cans one or more times.

I have found that the soluble ethylenediamine tetracetic acid compound can be advantageously used alone for the preservation of the natural color, flavor and appearance of seafood.

I have further found that such compounds can advantageously be used in conjunction with aluminum salts, such as are described in my prior Patent No. 2,027,270, dated January 6, 1936, both as dips for the seafood or by direct addition to the filled container just before sealing. I have further found that when the soluble ethylenediamine tetracetic acid compounds are used in conjunction with aluminum salts in acid solutions to protect the seafood against discolorations, the quantity of the soluble compound required is considerably less than when used alone. Thus, in crabmeat, which is particularly susceptible to blue and gray discolorations, I have determined that only 10 to 20% of the amount of ethylenediamine tetracetic acid compound is necessary to prevent discoloration, as compared with the amount which would be required if used alone. And I have observed similar results for Pacific crabmeat, oysters and shrimp.

The soluble ethylenediamine tetracetic acid compound has been successfully used in water and brines acidified with acetic, citric, and phosphoric acids; and I have found that while the compound effectively combines with and holds the iron and copper in the pH range of from 3.00 to 10.00, the action is more rapid at slightly acidic pH values of 3.5 to 7.00. I have further found that in this pH range the ethylenediamine tetracetic acid compound is effective as an addition to aluminum salts, such as sodium aluminum sulfate, in the prevention of discoloration due to metals in crabmeat, shrimp, crayfish and lobster, clams and oysters.

In using the soluble ethylenediamine tetracetic acid compound with aluminum salts the seafood is advantageously soaked in a solution of the aluminum compound containing, e. g., 200 to 500 parts per million of aluminum. The soluble ethylenediamine tetracetic acid compound may also be added to the solution, e. g., to the extent of 0.1% to 1%. The treatment with the solution of the aluminum salt can also be used as a preliminary treatment or dip for the seafood with subsequent treatment with the ethylenediamine tetracetic acid compound either as a dip or by adding a small amount of the compound, e. g., to the seafood in the can before sealing, the amount in this case being less than that above indicated where the compound is used alone, without the aluminum salt treatment, e. g., one-half or less of the amount when used alone.

The process of the present invention is an advantageous process not only for preventing the development of discoloration in seafood of the kind indicated, but also in removing objectionable discoloration where it has developed. For example, oysters which have turned a bluish or greenish color may be restored to their natural white color by the addition of only a few parts per million of the ethylenediamine tetracetic acid compound.

The improved stabilized seafoods produced by the process of the present invention are characterized by containing small amounts of the ethylenediamine tetracetic acid compounds which may have reacted and combined with metal compounds to a greater or less extent but which are advanageously also present in small excess over that which is so combined to provide a reserve supply against discoloration during storage under conditions where additional metal compounds might become active and might otherwise tend to cause discoloration.

The improved food products of the present invention retain their normal or natural color, flavor and attractive appearance. The protective effect of the ethylenediamine tetracetic acid compound is obtained without any objectionable effect upon the food value of the preserved products. Thus, iced or frozen seafoods which would normally tend to discolor and lose their normal appearance and to some extent their flavor can be effectively protected and the color, appearance and taste preserved for considerable periods of time. Similarly canned seafood, which tends to change when subjected to heat treatment, including cooking in the cans, is also preserved against objectionable change in color, appearance and flavor by the presence of the ethylenediamine tetracetic acid compound.

I claim:

1. The method of preserving the natural color, flavor and appearance of fresh and processed seafoods of shellfish and crustaceans which comprises treating the same with a small amount of a soluble ethylenediamine tetracetic acid compound.

2. The method according to claim 1 in which discolored seafood is treated to improve the color and appearance.

3. The process according to claim 1 in which the seafood is dipped in a solution of the soluble ethylenediamine tetracetic acid compound.

4. The method according to claim 1 in which canned seafood has a small amount of the soluble ethylenediamine tetracetic compound included in the can.

5. The method of preserving the natural color, flavor and appearance of fresh and processed seafoods of shellfish and crustaceans which comprises treating the same with a small amount of a soluble aluminum compound and a small amount of a soluble ethylenediamine tetracetic acid compound.

6. The process according to claim 5 in which the seafood is treated first with a solution of the soluble aluminum compound and subsequently with a solution of the ethylenediamine tetracetic acid compound.

7. The process according to claim 5 in which the seafood is dipped in a solution containing both the aluminum compound and the ethylenediamine tetracetic acid compound.

8. The process according to claim 5 in which the seafood is first dipped in a dilute solution of the aluminum compound and is subsequently placed in a can for canning with a small amount of the ethylenediamine tetracetic acid compound.

9. Fresh and processed seafoods of shellfish and crustaceans containing a small amount of a soluble ethylenediamine tetracetic acid compound, said seafood retaining its natural color, flavor and appearance.

10. Seafood as defined in claim 9 in a frozen state.

11. Seafood as defined in claim 9 in the form of canned seafood, containing in the can a small amount of the ethylenediamine tetracetic acid compound.

12. Seafood as defined in claim 9 in the form of iced seafood.

13. Canned seafood as defined in claim 9 containing approximately 0.5 to 2.5 grams of a soluble ethylenediamine tetracetic acid compound per kilogram of seafood.

14. Iced and frozen seafood as defined in claim 9 containing from about 0.5 to 2 grams of the soluble ethylenediamine tetracetic acid compound per kilogram of seafood.

15. Canned shellfish having incorporated therein a small amount of the disodium salt of ethylenediamine tetraacetic acid.

CARL R. FELLERS.

References Cited in the file of this patent

UNITED STATES PATENTS

| Number | Name | Date |
| --- | --- | --- |
| 2,088,831 | Ash et al. | Aug. 3, 1937 |
| 2,381,019 | Webb | Aug. 7, 1945 |

OTHER REFERENCES

"The Properties and Uses of Ethylenediamine Tetra Acetic Acid and Its Salts," 1949, by A. E. Martell et al., published by Berswerth Chemical Co., Framingham, Mass.

"The Modern Chelating Agent," Technical Bulletin #1, published by Berswerth Chemical Co., Framingham, Mass.